(12) United States Patent
Kitamura et al.

(10) Patent No.: US 6,920,419 B2
(45) Date of Patent: Jul. 19, 2005

(54) APPARATUS AND METHOD FOR ADDING INFORMATION TO A MACHINE TRANSLATION DICTIONARY

(75) Inventors: Mihoko Kitamura, Kyoto (JP); Toshiki Murata, Nara (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 667 days.

(21) Appl. No.: 10/105,394

(22) Filed: Mar. 26, 2002

(65) Prior Publication Data

US 2002/0152081 A1 Oct. 17, 2002

(30) Foreign Application Priority Data

Apr. 16, 2001 (JP) ........................................ 2001-116927

(51) Int. Cl.[7] ............................................. G06F 17/20
(52) U.S. Cl. ........................................ 704/2; 704/277
(58) Field of Search ................................ 704/2–9, 231, 704/270, 277

(56) References Cited

U.S. PATENT DOCUMENTS

| | | | | |
|---|---|---|---|---|
| 5,299,124 A | * | 3/1994 | Fukumochi et al. | 704/2 |
| 5,299,125 A | * | 3/1994 | Baker et al. | 704/9 |
| 5,361,205 A | * | 11/1994 | Nishino et al. | 704/2 |
| 5,774,845 A | * | 6/1998 | Ando et al. | 704/231 |
| 6,442,524 B1 | * | 8/2002 | Ecker et al. | 704/277 |

FOREIGN PATENT DOCUMENTS

JP          06119378          4/1994

OTHER PUBLICATIONS

U.S. Appl. No. 09/909,901, filed Jul. 23, 2001 titled "Apparatus and Method for Natural Language Processing".

* cited by examiner

Primary Examiner—David D. Knepper
(74) Attorney, Agent, or Firm—Venable LLP; Michael A. Sartori

(57) ABSTRACT

Given a source text, a desired translation of the source text into a target language, and a machine-readable dictionary, a first set of morphemes in the target language is generated from the source text, typically by using the dictionary to perform a machine translation of the source text. The second text is analyzed into a second set of morphemes in the target language. Differences between the first and second sets of morphemes are found, and morphemes corresponding to the differences are taken from the source text. Existing information including these source-text morphemes is extracted from the dictionary, and new information to be added to the dictionary is automatically generated from the extracted information and the differences. This process generates comparatively short dictionary entries, corresponding only to the differences between the two set of morphemes, and therefore creates useful dictionary entries while saving dictionary space.

18 Claims, 18 Drawing Sheets

FIG.2

4.1 [en : VP arrest : pos                                          [ja : VP [1 : NP] wo taihosuru]
          = v[1 : NP : meaning = person]]
(4.1a, 4.1b)

4.2 [en : VP arrest : pos                                          [ja : VP [1 : NP] wo sosisuru]
          = v[1 : NP : = person]]

4.3 [en : N : meaning = person                              [ja : N keisatukan]
         policeman : pos = n]

4.4 [en : NP : meaning = person                            [ja : NP kare]
         him : pos = prm]

4.5 [en : Art the : pos = art]                                          [ja : Art]

4.6 [en : NP : meaning = {1}[1:Art]                        [ja : NP [1 :N]]
         [1 : N : meaning = {1}]]

4.7 [en : S[1 : NP : case = subjective                 [ja : S [1 :N]ga[2 :VP]]
         case : meaning = {meaning}]
         [2 : VP : subjective case meaning = {meaning}]]
(4.7a, 4.7b)

4.8 [en : N : meaning = state                                  [ja : N akka]
         deterioration : pos = n]

FIG.4

EXAMPLE 1
SOURCE TEXT:
Record profits were announced last week. ~9.1a
TRANSLATED TEXT:
Kiroku rieki wa sakushu happyo sareta. ~9.1b
MODIFIED TEXT:
Shunyu kiroku wa sakushu happyo sareta. ~9.1c

EXAMPLE 2
SOURCE TEXT:
I found the proper replacement for the variable. ~9.2a
TRANSLATED TEXT:
Watashi wa hensu no tame ni tekisetsuna kokan wo mitsuketa. ~9.2b
MODIFIED TEXT:
Watashi wa hensu no tame no tekisetsuna chikan wo mitsuketa. ~9.2c

FIG.5

EXAMPLE 1
Kiroku rieki wa sakushu happyosuru rareru ta. ~10.1

EXAMPLE 2
Watashi wa hensu notame ni tekisetsuda kokan wo mitsukeru ta. ~10.2

EXAMPLE 1

[en : N profit] ~11.1a
    [ja : Ms rieki] ~11.1b
    :

EXAMPLE 2

[en : ModV for [1 : NP]]  } 11.2a
    [ja : ModV [1 : NP] no tame ni] }

[en : N replacement]  } 11.2b
    [ja : Ms kokan] }
    :

FIG.8

EXAMPLE 1
Shunyu kiroku wa sakushu happyosuru rareru ta. ~12.1

EXAMPLE 2
Watashi wa hensu notame no tekisetsuda kokan wo mitsukeru ta. ~12.2

FIG.9

EXAMPLE 1      13.2

| TRANSLATED SENTENCE | CLASS | MODIFIED SENTENCE |
|---|---|---|
| X ~13.1 | Mx | shunyu ~13.3 |
| kiroku | S | kiroku |
| rieki | Px | X |
| wa | S | wa |
| sakushu | S | sakushu |
| ⋮ | ⋮ | ⋮ |

EXAMPLE 2

| TRANSLATED SENTENCE | CLASS | MODIFIED SENTENCE |
|---|---|---|
| watakushi | S | watakushi |
| ⋮ | ⋮ | ⋮ |
| notame | S | notame |
| X | Mx | no |
| ni | Px | X |
| tekisetsuda | S | tekisetsuda |
| X | Mx | chikan |
| kokan | Px | X |
| wo | S | wo |
| ⋮ | ⋮ | ⋮ |

FIG.10

EXAMPLE 1

NONE

EXAMPLE 2

[en : PostModN for [1 : NP]]  ⎤ ─14.2a
[ja : PostModN [1 : NP] no tame no] ⎦

[en : N replacement]  ⎤ ─14.2b1
[ja : Ms chikan] ⎦

[en : N replacement]  ⎤ ─14.2b2
[ja : Ms henkan] ⎦

EXAMPLE 2

| TRANSLATED SENTENCE | CLASS | MODIFIED SENTENCE | |
|---|---|---|---|
| watakushi | S | watakushi | |
| ⋮ | ⋮ | ⋮ | |
| notame ni | S' | notame no | ─16.2a |
| tekisetsuda | S | tekisetsuda | |
| kokan | S' | chikan | ─16.2b |
| wo | S | wo | |
| ⋮ | ⋮ | ⋮ | |

FIG.14

| | BEFORE UPDATE | AFTER UPDATE |
|---|---|---|
| 1 | A \| S \| a <br> B \| S \| i <br> x \| Mx \| u <br> D \| S \| e | A \| S \| a <br> BD \| S' \| iue |
| 2 | A \| S \| a <br> B \| Px \| x <br> x \| Mx \| i <br> C \| S \| u | A \| S \| a <br> B \| S' \| i <br> C \| S \| u |
| 3 | CROSSOVER <br> x \| Mx \| a <br> B \| S \| i <br> A \| Px \| x <br><br> NON-CONSECUTIVE <br> A \| Px \| x <br> x \| Mx \| a <br> B \| S \| i <br> x \| Mx \| u <br> D \| S \| e | BA \| S' \| ai <br><br><br><br> AB \| S' \| aiu <br> D \| S \| e |
| 4 | A \| Px \| x <br> x \| Mx \| a <br> B \| S \| i <br> x \| Mx \| u <br> D \| S \| e <br> E \| Px \| x | A \| S' \| a <br> B \| S \| i <br> DE \| S' \| ue |

EXAMPLE 1

| TRANSLATED SENTENCE | CLASS | MODIFIED SENTENCE | |
|---|---|---|---|
| kiroku rieki | S' | shunyu kiroku | — 21.1 |
| wa | S | wa | |
| ⋮ | ⋮ | ⋮ | |

START — 4.03, 4.07
↓
COLLECT EXISTING PATTERNS — 5.01
↓
IDENTIFY MINIMAL PATTERN — 5.02
↓
SUBSTITUTE MORPHEMES FOR VARIABLE — 5.03
↓
MODIFY PATTERN TO CREATE NEW TRANSLATION PATTERN — 5.04
↓
UPDATE ASSOCIATION TABLE — 5.05
↓
END — 4.04, 4.08

FIG.17

EXAMPLE 2 n=0     [en : ModV for : pos = prep [1 : NP]]
         [ja : ModV [1 : NP] no tame ni]

n=1     [en : N replacement : pos = n: *]
         [ja : Ms kokan]

FIG.18

EXAMPLE 2 n=0     [en : PostModN for the variable]
         [ja : PostModN hensu no tame ni] ～18.2a

FIG.19

EXAMPLE 2 n=0     [en : PostModN for the variable]
         [ja : PostModN no tame no] ～19.2a n=1     [en : N replacement]
         [ja : Ms chikan] :

FIG.20

EXAMPLE 2

| TRANSLATED SENTENCE | CLASS | MODIFIED SENTENCE | |
|---|---|---|---|
| watakushi | S | watakushi | |
| ⋮ | ⋮ | ⋮ | |
| notame ni | S | notame no | ←20.2a |
| tekisetsuda | S | tekisetsuda | |
| kokan | S | chikan | ←20.2b |
| ⋮ | ⋮ | ⋮ | |

FIG.21

EXAMPLE 1 n=0   [en : N record]
      [ja : Ms kiroku]

[en : N profit]
      [ja : Ms rieki]

FIG.22

EXAMPLE 2 n=0   [en : NP [1 : N] [2 : NP]]
      [ja : NP [1 : Ms] [2 : NP]]

FIG.23

EXAMPLE 1 n=0    [en : NP record profit]
       [ja : NP kiroku rieki]

FIG.24

EXAMPLE 2 n=0    [en : NP record profit]
       [ja : NP shunyu kiroku]

APPARATUS AND METHOD FOR ADDING INFORMATION TO A MACHINE TRANSLATION DICTIONARY

BACKGROUND OF THE INVENTION

1. Field of the Invention

The present invention relates generally to machine translation, and more specifically to a method and apparatus for generating new information to be added to a dictionary used in a machine translation system: for example, to a user-maintained translation pattern dictionary in a machine translation system that employs translation patterns.

2. Description of the Related Art

As the translation quality of machine translation systems improves, improvements and enhancements of the translation dictionaries in these systems have become essential. At present, therefore, the proliferation of machine translation systems is accompanied by a proliferation of specialized dictionaries and the like for translating documents in specific fields. To provide a user with the translation result he or she wants, however, adding specialized dictionaries does not suffice in cases in which the document to be translated includes its own special expressions that the machine translation system cannot analyze, or when the translations of words need to be adjusted at the individual user level.

Users of machine translation systems therefore conventionally pre-edit the documents input to a machine translation system so that the system can analyze them, and post-edit the translation result. If these pre-editing and post-editing tasks are independent of the machine translation system, however, they fail to have any effect on the machine translation process. If the same or similar source text appears repeatedly when a document is translated, the user must repeat the necessary editing tasks each time, making the editing work extremely tedious and troublesome.

Japanese Unexamined Patent Application Publication No. H6-119378 addresses this problem by proposing that the results of pre-editing and post-editing be incorporated into a dictionary. Specifically, it proposes a means of adjusting the translation algorithm of the machine translation system by using a source text and a model translation thereof, a pre-edited text and the machine translation result, or a source text and the post-edited machine translation result. In the last of these three cases, if the machine translation result and the post-edited result differ, a dictionary entry or a syntax rule is derived from the post-edited result and added to the existing word dictionary or syntax-rule dictionary used by the machine translation system. A syntax rule in this context is a pattern in which a notation indicating a text category such as 'sentence' or 'phrase' appears on the left, and a string of words constituting an object in the indicated category appears on the right.

In the basic scheme, the exact result of post-editing becomes the added dictionary or syntax-rule entry. For example, if a user post-edits a Japanese machine translation result to obtain sentence A below, the added pattern B will consist of the source sentence and sentence A.
Source Sentence:
 The class has a black board.
Machine Translation:
 Sono kyoshitsu wa, kuroi ita wo motteiru.
Post-Edited Sentence (A):
 Sono kyoshitsu wa, kokuban wo motteiru.
Pattern (B)
 [Sentence: The class has a black board.]
 [Sentence: Sono kyoshitsu wa, kokuban wo motteiru.]
As a result, if a sentence such as "The class has two black boards" is encountered, it does not fit pattern B, so the desired translation of "black board" ('kokuban') cannot be obtained.

The above patent application also proposes a way to enhance the versatility of the added syntax rule. If there are several combinations of source sentences and model translated sentences, a pattern can be obtained from them by partial abstraction, on the basis of similarities between the source sentences and the model translated sentences. An example of such a partially abstracted rule is:
 [Sentence: The class has $1 black board.]
 [Sentence: Sono kyoshitsu wa, $1 kokuban wo motteiru.]
If this pattern is added, a correct translation of "The class has three black boards" can be obtained. "There is a black board in my class", however, differs from "The class has three black boards" in the text both preceding and following "black board", so when "There is a black board in my class" is translated, the correct translation of "black board" still is not obtained.

When dictionary entries and syntax rules are added in this way, based on entire source sentences, even though the adding of sentence entries uses up large amounts of memory, the rate of reuse of the added entries is low, so this entry method cannot be said to be efficient. As to the above method of making abstracted patterns, similar source sentences and translated model sentences are needed. When there are only a few translated model sentences, the probability that there will be similar translated model sentences is low, and abstraction is unlikely to be possible.

Therefore, there is a need for a still more efficient and versatile method and apparatus for deriving new information to be added to a dictionary used for machine translation, especially when relatively few model translated sentences are available.

SUMMARY OF THE INVENTION

A general object of the present invention is to provide an efficient method of deriving new information to be added to a dictionary used for machine translation.

A more specific object is to derive new information having a high degree of utility without occupying excessive space in the dictionary.

Another object is to derive such information from a limited amount of input text.

Yet another object is to provide a machine translation system incorporating such a method.

In the invented method of deriving new information to be added to a dictionary used in machine translation, the new information is derived from a first text in a source language and a second text in a target language, the second text being a desired translation of the first text. The new information is obtained by generating a first set of morphemes in the target language from the first text, analyzing the second text into a second set of morphemes in the target language, and finding differences between the first and second sets of morphemes. Information including morphemes in the source language corresponding to these differences is then obtained from the dictionary, and new information to be added to the dictionary is generated on the basis of this information and the differences.

The dictionary may be a translation pattern dictionary, in which case the new information consists of translation patterns. Each translation pattern comprises a source language pattern including a morpheme or a group of morphemes in the source language, typically derived from the first text, and a target language pattern including a morpheme or a group of morphemes in the target language, typically taken from the second set of morphemes. The translation patterns may also include variables representing morphemes or groups of morphemes. Variables are abstracted from the morphemes they represent on the basis of information obtained from the dictionary, typically on the basis of information that was used to generate the first and second sets of morphemes from the first and second texts.

The second text may be a post-edited machine translation of the first text. Alternatively, the second text may be a machine translation of a pre-edited version of the first text.

The invention also provides an apparatus that derives new information by the above method for addition to a dictionary used in machine translation, a machine translation system including this apparatus, and a machine-readable medium storing a computer program for generating new information by the method above, either independently or as part of a machine translation process.

BRIEF DESCRIPTION OF THE DRAWINGS

In the attached drawings:

FIG. 2 shows examples of translation patterns;

FIG. 4 shows examples of source sentences, translated sentences, and modified sentences used for explaining the operation of the first embodiment;

FIG. 5 shows examples of the result of morpheme generation in the target language, as stored in OrgMorphBuffer in FIG. 1;

FIG. 8 shows examples of results of morpheme analysis in the target language, as stored in MorphBuffer in FIG. 1;

FIG. 9 shows examples of results of difference detection, presented as an association table stored in DiffBuffer in FIG. 1;

FIG. 10 shows examples of patterns found by dictionary look-up during difference processing, as stored in SamePatternBuffer in FIG. 1;

FIG. 14 illustrates various types of reconstruction of the association table in DiffBuffer;

FIG. 17 shows some translation patterns collected in ChildPatternBuffer in FIG. 1 for the second example sentence at the beginning of the process in FIG. 16;

FIG. 18 illustrates the substitution of words for variables in the first example in FIG. 17, showing a translation pattern stored in OrgEntryPatternBuffer in FIG. 1;

FIG. 19 shows new translation patterns created for the second example sentence in the first embodiment, as stored in EntryPatternBuffer in FIG. 1;

FIG. 20 shows an example of an association table in DiffBuffer after being updated at the end of the process in FIG. 16;

FIG. 21 shows some translation patterns collected in ChildPatternBuffer for the first example sentence at the beginning of the process in FIG. 16;

FIG. 22 shows an example of a minimal pattern stored in OrgEntryPatternBuffer for the first example sentence;

FIG. 23 shows the example in FIG. 22 after the substitution of words for variables;

FIG. 24 shows a new translation pattern created for the first example sentence in the first embodiment, as stored in EntryPatternBuffer;

DETAILED DESCRIPTION OF THE INVENTION

Figure 1:
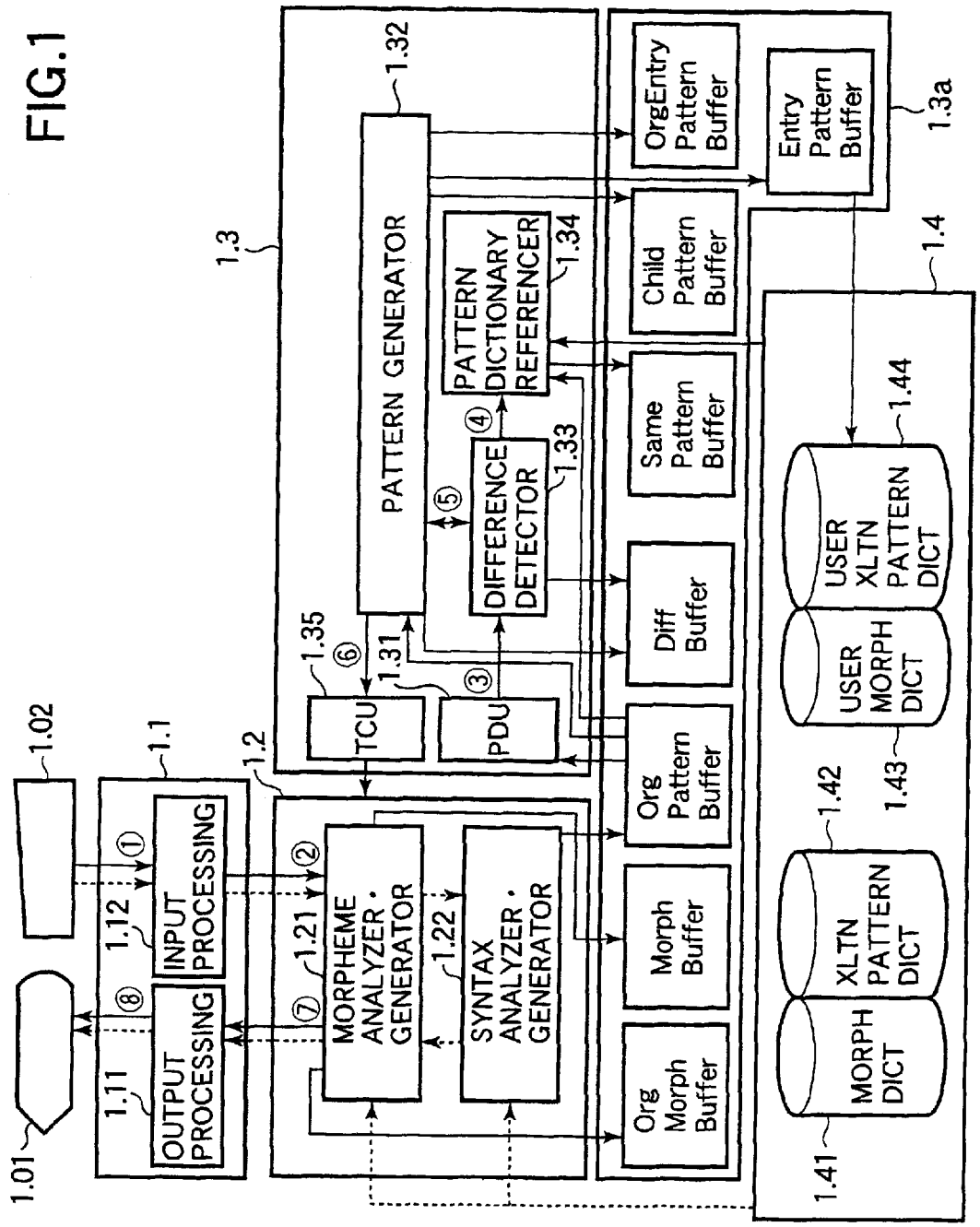
FIG. 1 is a functional block diagram of a machine translation system according to a first embodiment of the invention.

Embodiments of the invention will be described with reference to the attached drawings, in which like parts are indicated by like reference characters. The embodiments are machine translation systems using translation pattern dictionaries.

For simplicity, the machine translation systems in the embodiments will translate one sentence at a time. Two example sentences will be shown, but each is translated and post-edited independently.

Although the embodiments are not restricted to any particular source language and target language, when explanatory examples are given, the source language will be English and the target language will be Japanese. It will also be assumed that the embodiments are bi-directional machine translation systems with functions for translation both from the source language to the target language and from the target language to the source language.

In practice, machine translation systems are often constructed by loading processing programs (illustrated in FIGS. 3, 7, 11, 16, and 25) and various types of data (e.g., dictionary data) from a machine-readable recording medium such as a magnetic or optical disk into an information processing apparatus such as a personal computer. In the first embodiment, these operations produce a machine translation system with the functional block structure shown in FIG. 1, which is drawn to emphasize the post-editing function.

The machine translation system in FIG. 1 can be broadly divided into an input-output unit 1.1, a translation processor 1.2, a post-editing learning unit 1.3, and a dictionary storage unit 1.4.

The input-output unit 1.1 is divided into an output processing section 1.11 and an input processing section 1.12. The input processing section 1.12 receives source text to be translated, and translated text that has been post-edited by the user (referred to below as modified text), from an input device 1.02 such as a keyboard or a file input device. The output processing section 1.11 outputs translated text to an output device 1.01 such as a display device, a printer, or a file storage device.

The translation processor 1.2 comprises a morpheme analyzer-generator 1.21 that analyzes morphemes in the source text and generates corresponding morphemes in the target language, and a syntax analyzer-generator 1.22 that uses translation patterns to analyze source-language syntax, and generates corresponding target-language syntax. The morpheme analyzer-generator 1.21 can also analyze morphemes in the target language and generate morphemes in the source language.

The first embodiment is not restricted to a translation processor 1.2 having this internal structure; any known translation processor that employs translation patterns may be used. Examples include the translation processor proposed in Japanese Unexamined Patent Application Publication No. H5-290082, and the one described in the specification and drawings of Japanese Patent Application No. 2000-225911.

The dictionary storage unit 1.4 comprises a morpheme dictionary (MORPH DICT) 1.41 and translation pattern dictionary (XLTN PATTERN DICT) 1.42 storing information provided initially by the machine translation system, and a user morpheme dictionary 1.43 and user translation pattern dictionary 1.44 to which a user can add new information. The morpheme dictionary 1.41 and user morpheme dictionary 1.43 store morpheme information. The translation pattern dictionary 1.42 and user translation pattern dictionary 1.44 store translation patterns, each translation pattern comprising a source language pattern and a corresponding target language pattern.

FIG. 2 shows examples of translation patterns 4.1 to 4.8 of the type stored in the translation pattern dictionary 1.42 and user translation pattern dictionary 1.44. English patterns appear on the left, and corresponding Japanese patterns on the right. In each language, a pattern has the following structure:

[language name: pattern name pattern elements]

Either English (en) or Japanese (ja) is specified as the language name.

Following the language name, a phrase structure marker such as VP (verb phrase), NP (noun phrase), or N (noun) is used as the pattern name.

The pattern elements comprise on or more words and/or variables. A variable is expressed in the following form:

[arbitrary number: pattern name]

The pattern name in a variable is the name of another pattern, corresponding to a lower node in the syntactical tree structure. The arbitrary number indicates a correspondence between variables in the source-language pattern and the paired target-language pattern. Syntax analysis produces a syntax tree structure in which patterns are nested by the substitution of patterns for variables (resolving the variable reference).

Words and pattern names can have information (identity information) giving details of their meaning etc. Identity information is expressed in an A=B format in which A indicates the type of identity information represented by B. In pattern 4.1, for example, identity information 4.1a identifies the part of speech (pos) of the word "arrest", specifying that it is used as a verb (v), and identity information 4.1b identifies the variable noun phrase following "arrest" as meaning a person. Identity information can also be expressed in a variable form. For example, in pattern 4.7, which describes a sentence consisting of an arbitrary noun phrase (NP) followed by a verb phrase (VP), variables 4.7a and 4.7b are used to indicate that the verb phrase must take a subject with the type of meaning expressed by the noun phrase.

The post-editing learning unit 1.3 comprises a processing decision unit (PDU) 1.31 that decides what type of translation pattern to create, a pattern generator 1.32 that creates new translation patterns, a difference detector 1.33 that detects differences between translated text and modified text, a pattern dictionary referencer 1.34 that takes translation patterns from the translation pattern dictionary 1.42 and the user translation pattern dictionary 1.44, and a translation command unit (TCU) 1.35 that issues translation commands to the translation processor 1.2.

A buffer section 1.3a is provided for use in processing by the post-editing learning unit 1.3. The buffer section includes various types of buffers, among which are an OrgMorphBuffer that stores results of morpheme generation for a translated text, a MorphBuffer that stores results of morpheme analysis of a modified text, an OrgPatternBuffer that stores the results of syntax analysis of the source text and syntax generation for the translated text, a DiffBuffer that stores differences between the translated text and the modified text, and a SamePatternBuffer, ChildPatternBuffer, OrgEntryPatternBuffer, and EntryPatternBuffer, which store initial and newly added translation patterns.

Figure 3:
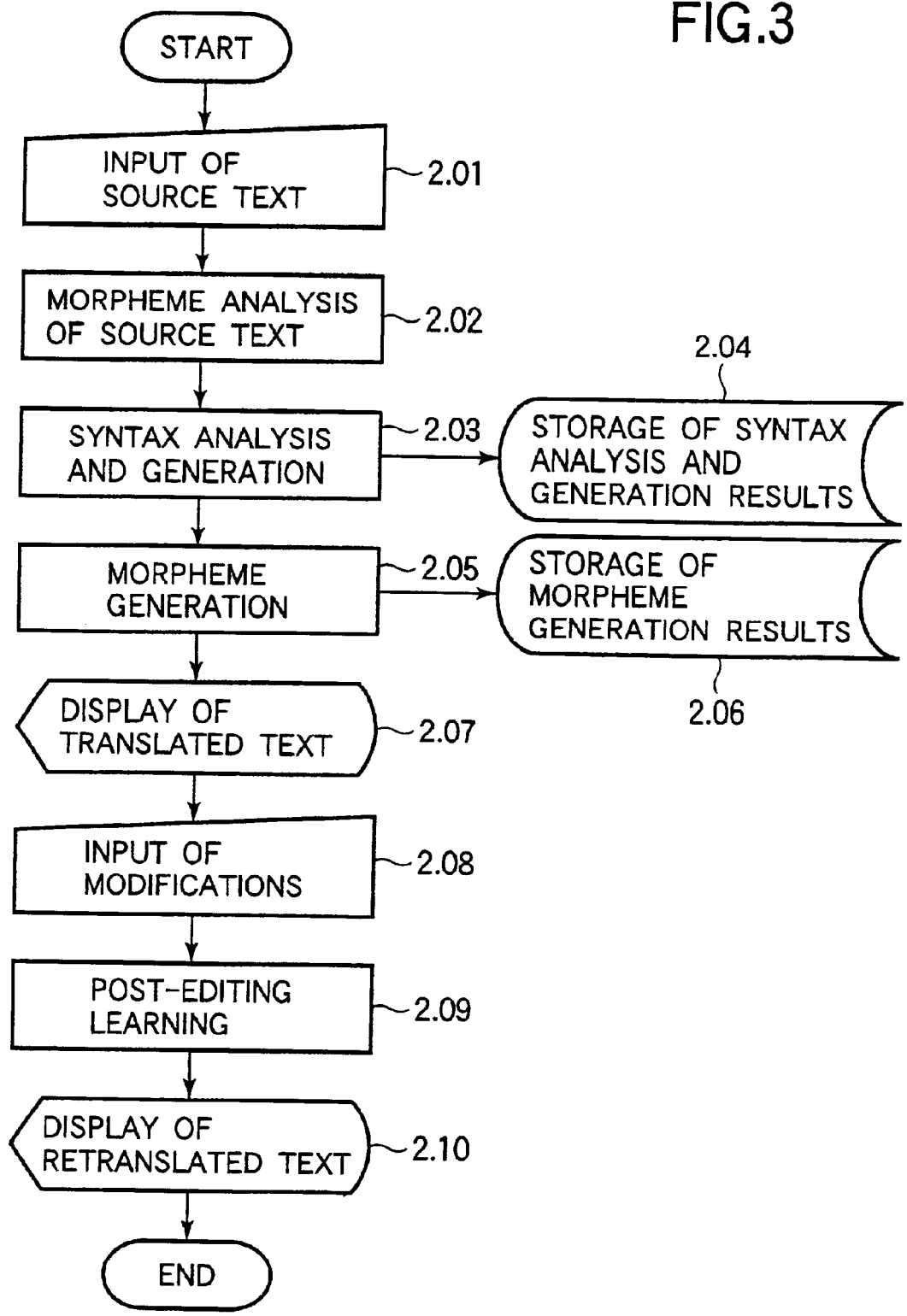
FIG. 3 is a flowchart of the operation of the first embodiment.

FIG. 3 is a flowchart that shows the operation of the machine translation system of the first embodiment from the viewpoint of the post-editing learning processing. An example will be explained in which the source sentences "Record profits were announced last week" 9.1a and "I found the proper replacement for the variable" 9.2a are input, translated, and modified as in FIG. 4.

When a user inputs one of these source sentences 9.1a, 9.2a from the input device 1.02 (e.g., from a keyboard), the input processing section 1.12 receives the source sentence and provides it to the morpheme analyzer-generator 1.21 in the translation processor 1.2. (step 2.01). The morpheme analyzer-generator 1.21 analyzes the source sentence into morphemes by using information in the morpheme dictionary 1.41 and the user morpheme dictionary 1.43. (step 2.02). Using the results of this morpheme analysis, and drawing on the translation pattern dictionary 1.42 and user translation pattern dictionary 1.44, the syntax analyzer-generator 1.22 analyzes the syntax of the source sentence, generates corresponding target-language syntax, and stores the results obtained from syntax analysis and generation in OrgPatternBuffer (step 2.04). The morpheme analyzer-generator 1.21 then generates target-language morphemes, uses the result of morpheme generation to obtain a translated sentence (step 2.05), and outputs the translated sentence to the output device 1.01 (step 2.07). During this process, the results of morpheme generation (not yet processed for inflection) are stored in OrgMorphBuffer (step 2.06).

The above processing outputs translated sentences 9.1b and 9.2b for the source sentences 9.1a and 9.2a, as shown in FIG. 4. FIG. 5 shows the results of morpheme generation stored in OrgMorphBuffer, and FIG. 6 partially shows the results of syntax analysis and generation stored in OrgPatternBuffer. The results of morpheme generation and syntax analysis and generation also include parts of speech, which are omitted in FIGS. 5 and 6.

The morphemes generated for the translated sentences, such as the Japanese morphemes in sentences 10.1 and 10.2 in FIG. 5, will be referred to below as translated sentence morphemes. The patterns into which the source sentences are analyzed, such as pattern 11.1a in FIG. 6, will be referred to as source sentence patterns, and the corresponding patterns generated for the translated sentences, such as pattern 11.1b, will be referred to as translated sentence patterns. A pair of patterns consisting of a source sentence pattern and the corresponding translated sentence pattern in OrgPatternBuffer is similar to a translation pattern, and will be referred to below as a translation pattern, even though it may have been generated by the translation processor 1.2 from information in the morpheme dictionary 1.41 or user morpheme dictionary 1.43 and does not appear in the translation pattern dictionary 1.42 or user translation pattern dictionary 1.44.

These operations, up to the point at which the translated sentence is obtained, correspond to the flow of data shown by the dotted arrows in FIG. 1, and are similar to conventional machine translation operations except for the storage of data in OrgMorphBuffer and OrgPatternBuffer, which is related to post-editing.

Next, the user modifies the incorrect parts of the translated sentence by using the input device 1.02 (e.g., keyboard)

(step 2.08). The translated sentences 9.1b and 9.2b shown in FIG. 4, for example, are modified to sentences 9.1c and 9.2c. The input processing section 1.12 receives the modified sentence, and the post-editing learning unit 1.3 carries out a post-editing learning process, treating the modified sentence as a desired translation of the source sentence and using information obtained when the machine-translated sentence was generated (step 2.09).

After the post-editing learning process, a new machine-translated sentence incorporating the learned material is displayed (step 2.10), and the overall process ends. The process from the input of the modified sentence to the display of the new machine-translated sentence is indicated by the numbered arrows from (1) to (8) in FIG. 1 and will be described in detail below.

Figure 7:
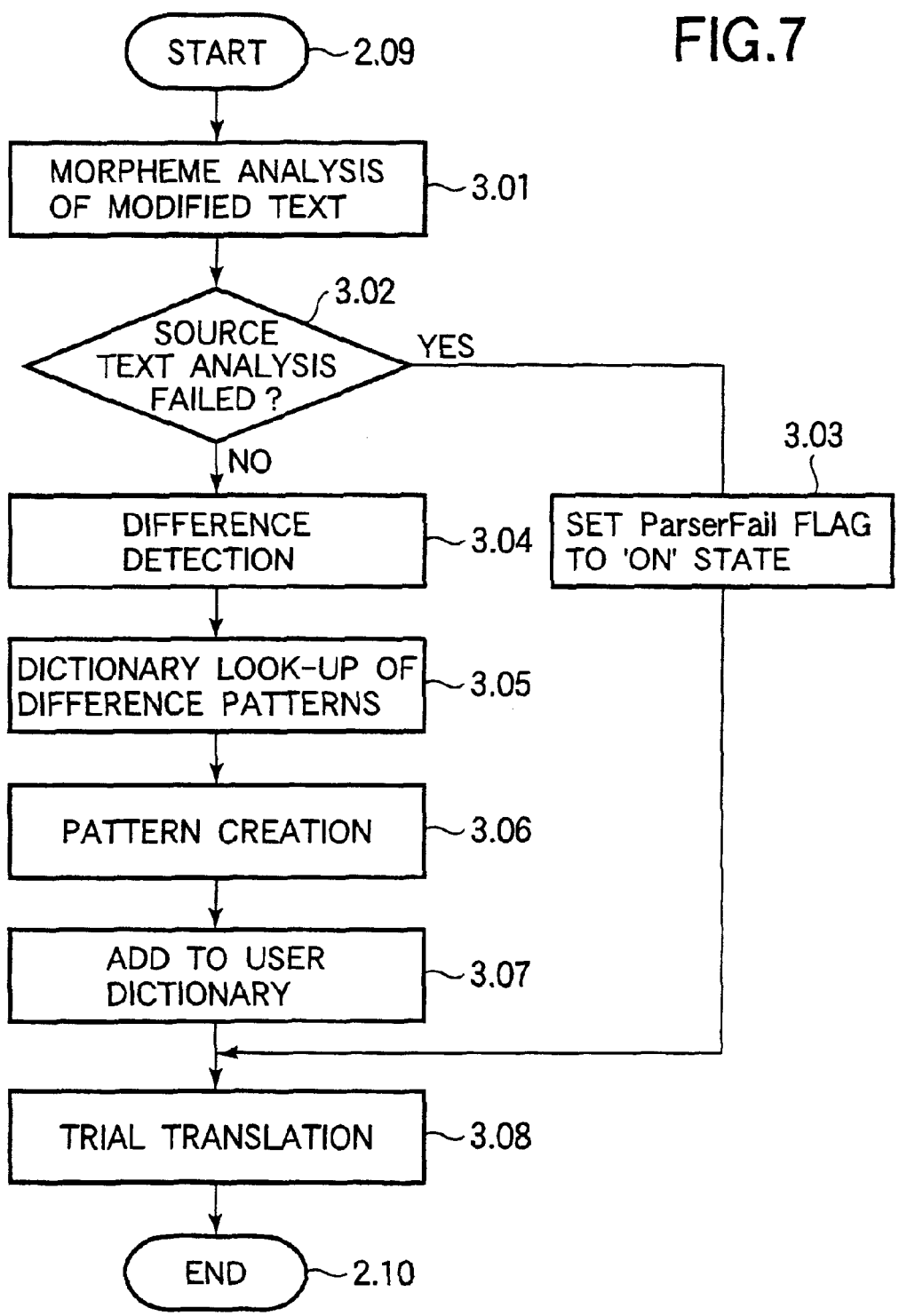
FIG. 7 is a flowchart of a post-editing learning process in the first embodiment.

FIG. 7 is a flowchart that shows the flow of the post-editing learning process (step 2.09) carried out by the post-editing learning unit 1.3.

The morphemes in an input modified sentence are analyzed by the morpheme analyzer-generator 1.21 (step 3.01), and the result of morpheme analysis is stored in MorphBuffer. FIG. 8 shows the results of morpheme analysis of the modified sentences 9.1c, and 9.2c in FIG. 4 (omitting parts of speech). These results 12.1 and 12.2 are stored in MorphBuffer. The morphemes into which the modified sentences are analyzed, such those in FIG. 8, will be referred to below as modified sentence morphemes.

Next, the processing decision unit 1.31 determines whether the syntax analysis of the source sentence succeeded or failed, by referring to the result of syntax analysis and generation stored in OrgPatternBuffer in the above step 2.04 (step 3.02).

If the analysis failed, a ParserFail flag is set to the 'on' state (step 3.03), and the post-editing learning process proceeds to a trial translation process (step 3.08) described below. Initially, when the process of translating a source sentence begins, the ParserFail flag is cleared to the 'off' state.

If the analysis of the syntax of the source sentence failed, it would be meaningless to detect differences (a process described below) between the results of morpheme generation for the original translated sentence (translated sentence morphemes) and morpheme analysis of the modified sentence (modified sentence morphemes). There is no choice but to add the information given by the whole modified sentence as a user entry, without further processing, and the ParserFail flag is set to indicate that state.

If the analysis of the syntax of the source sentence succeeded, the difference detector 1.33 attempts to associate the translated sentence morphemes with the modified sentence morphemes, identifies any differences between them (step 3.04), and indicates the differences in DiffBuffer. More specifically, the difference detector 1.33 constructs an association table listing the translated sentence morphemes and the modified sentence morphemes and classifying the relationships between them into the following three classes Px, Mx, and S.

Class Px: translated sentence morphemes not paired with modified sentence morphemes Class Mx: modified sentence morphemes not paired with translated sentence morphemes Class S: matching pairs of translated sentence morphemes and modified sentence morphemes, appearing in positions such that they are matched without crossovers between different matching pairs Dynamic programming (DP) methods such as the DP matching method, and the less precise method of simply detecting differences sequentially from the beginning, can be used to find associations and differences between the translated sentence morphemes and modified sentence morphemes.

FIG. 9 shows the association tables constructed for the two example sentences in FIG. 4. The translated sentence morphemes are taken from OrgMorphBuffer (FIG. 6); the modified sentence morphemes are taken from MorphBuffer (FIG. 8). The modified sentence morpheme 13.3 ('shunyu'), for example, does not have a corresponding translated sentence morpheme 13.1, so its class 13.2 is Mx.

Next, the pattern dictionary referencer 1.34 extracts translation patterns including morphemes in class Px, the class of translated sentence morphemes without corresponding modified sentence morphemes, from OrgPatternBuffer and places these patterns in DiffBuffer. The pattern dictionary referencer 1.34 then looks in the existing translation pattern dictionary 1.42 and user translation pattern dictionary 1.44 of the machine translation system for translation patterns having the same source sentence morphemes as the source sentence morphemes of the source sentence patterns of the translation patterns including the above morphemes in class Px, and stores the translation patterns it finds in SamePatternBuffer (step 3.05).

FIG. 10 illustrates some results of the above dictionary look-up process, showing examples of patterns stored in SamePatternBuffer.

In the first example sentence, the morpheme 'rieki', which appears as a translated sentence morpheme but not as a modified sentence morpheme (class Px), occurs in a translation pattern in OrgPatternBuffer (see FIG. 6) in which the paired source sentence pattern is [en:N profit]. The pattern dictionary referencer 1.34 therefore searches in the translation pattern dictionary 1.42 and the user translation pattern dictionary 1.44 for any translation patterns including the English noun "profit". It will be assumed below that no translation patterns in the pattern dictionaries 1.42, 1.44 include this noun, so the dictionary look-up process yields no result, indicated by the word "none" 14.1.

In the second example sentence, the morphemes 'ni' and 'kokan' appear as translated sentence morphemes but not as modified sentence morphemes (class Px). Referring to patterns 11.2a and 11.2b in OrgPatternBuffer (FIG. 6), the pattern dictionary referencer 1.34 finds that the corresponding source sentence morphemes are "for" and "replacement", searches in the translation pattern dictionary 1.42 and user translation pattern dictionary 1.44 for translation patterns including either of these two morphemes, and finds the three translation patterns 14.2a, 14.2b1, and 14.2b2 shown in FIG. 10.

This process of looking up translation patterns in the translation pattern dictionary 1.42 and the user translation pattern dictionary 1.44 (step 3.05 in FIG. 7) is carried out to obtain additional information for use in associating translated sentence morphemes with modified sentence morphemes, in order to construct new translation patterns that will be added as user entries to the user translation pattern dictionary 1.44.

The new translation patterns that will be added as user entries are created (step 3.06) by a process shown in FIG. 11 and described below. The new translation patterns are added to the user translation pattern dictionary 1.44 (step 3.07), and a trial translation process, shown in FIG. 25 and described later, is performed to confirm the result of post-editing learning (step 3.08). When translation patterns are added to the user translation pattern dictionary 1.44, user entries may also be added to the user morpheme dictionary 1.43, to supply translations of hitherto unknown words, for example.

Figure 11:
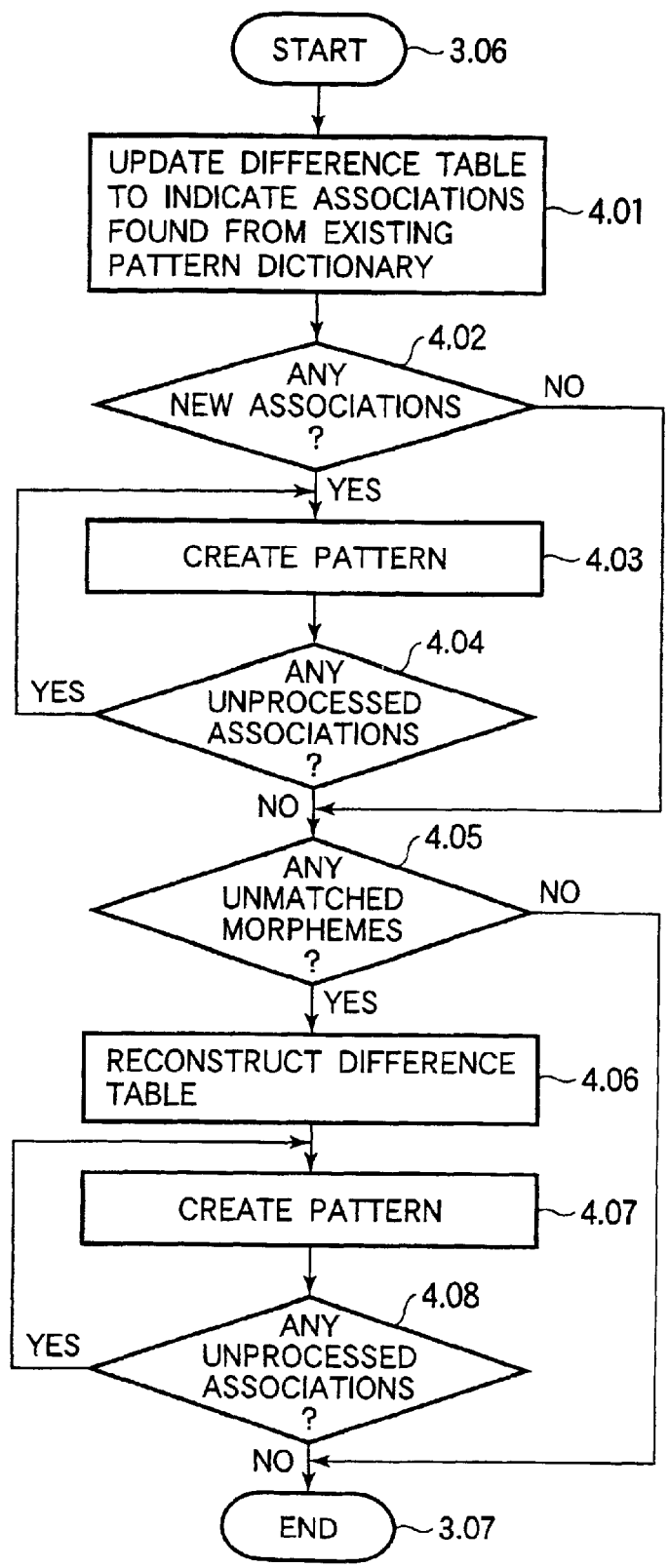
FIG. 11 is a flowchart of the translation pattern creation process in the first embodiment.

FIG. 11 is a flowchart that shows the process by which the pattern creation step 3.06 is carried out. This process creates new translation patterns that reflect the results of post-editing.

First, the pattern generator 1.32 uses the existing translation patterns found in the pattern dictionaries 1.42 and 1.44 by the pattern dictionary referencer 1.34 to associate modified sentence morphemes with the translated sentence morphemes that are not identical (step 4.01).

If a morpheme of class Mx, namely a modified sentence morpheme not matching a translated sentence morpheme, is included in a translation pattern stored in SamePatternBuffer (therefore, in one of the translation patterns stored in the existing pattern dictionaries 1.42 and 1.44), the process in step 4.01 associates the modified sentence morpheme with the translated sentence morpheme included in the translation pattern stored in SamePatternBuffer, and updates DiffBuffer to indicate the new association. If the stored translation pattern including the modified sentence morpheme of class Mx includes several morpheme elements, then a group of several modified sentence morphemes, one of which is the modified sentence morpheme under discussion, may be associated with a group of several translated sentence morphemes, to which they are related by the translation pattern. These newly found associations of translated sentence morphemes and modified sentence morphemes are classified as belonging to class S'.

Figures 12, 13:
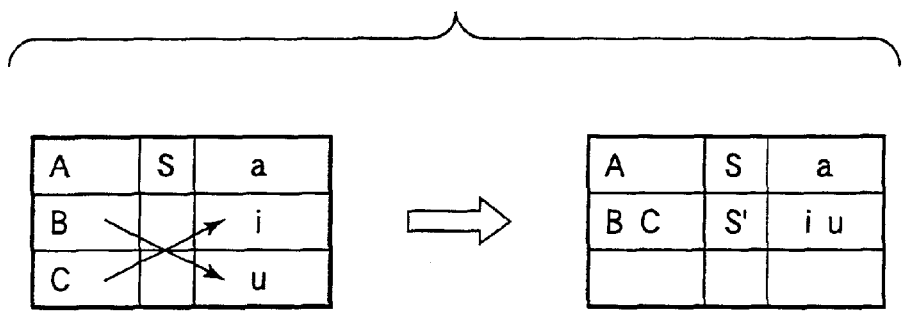
FIG. 12 illustrates the combining of morphemes in the association table in DiffBuffer.
FIG. 13 shows an example of a reconstructed association table stored in DiffBuffer.

When the modified sentence morphemes are associated with the translated sentence morphemes, preceding and following translated sentence morphemes or modified sentence morphemes may be combined to prevent crossovers. FIG. 12 schematically illustrates this combining process. For example, even though morpheme "B" corresponds to morpheme 'u' and morpheme "C" corresponds to morpheme 'i' as shown at the left in FIG. 12, because of the crossover, morphemes "B" and "C" cannot be associated with their respective morphemes 'u' and 'i' unless they are combined. To associate the modified sentence morphemes with the translated sentence morphemes, therefore, when there is a crossover, a combining process is carried out as shown at the right in FIG. 12. In this case, morpheme "BC" is associated with morpheme 'iu'.

FIG. 13 shows the result of this process of associating modified sentence morphemes with differing translated sentence morphemes (step 4.01) for the first example sentence. The modified sentence morpheme 'chikan' 16.2b (class Mx in FIG. 9) is included in translation pattern 14.2b1 (FIG. 10) found by the pattern dictionary referencer 1.34 and stored in SamePatternBuffer, enabling the modified sentence morpheme 'chikan' to be associated with the translated sentence morpheme 'kokan'. Similarly, the modified sentence morpheme 'no' (class Mx in FIG. 9) is included in combination with the modified sentence morpheme 'notame' in translation pattern 14.2a (FIG. 10) in SamePatternBuffer, so the modified sentence morpheme 'notame no' 16.2a is associated with the combined translated sentence morpheme 'notame ni'. These new pairs are classified in class S' in the updated association table in DiffBuffer.

To return to the first example sentence, since no translation patterns were stored in SamePatternBuffer (FIG. 10), no new association is made in step 4.01, and the association table in DiffBuffer remains in the state shown in FIG. 9.

When the above process of updating (or not updating) the association table in DiffBuffer ends, the pattern generator 1.32 determines whether the association table in DiffBuffer was updated or not (step 4.02). Specifically, the pattern generator 1.32 determines whether the association table now includes an association, between a translated sentence morpheme and a modified sentence morpheme, which is classified in class S'.

Figures 15, 16:
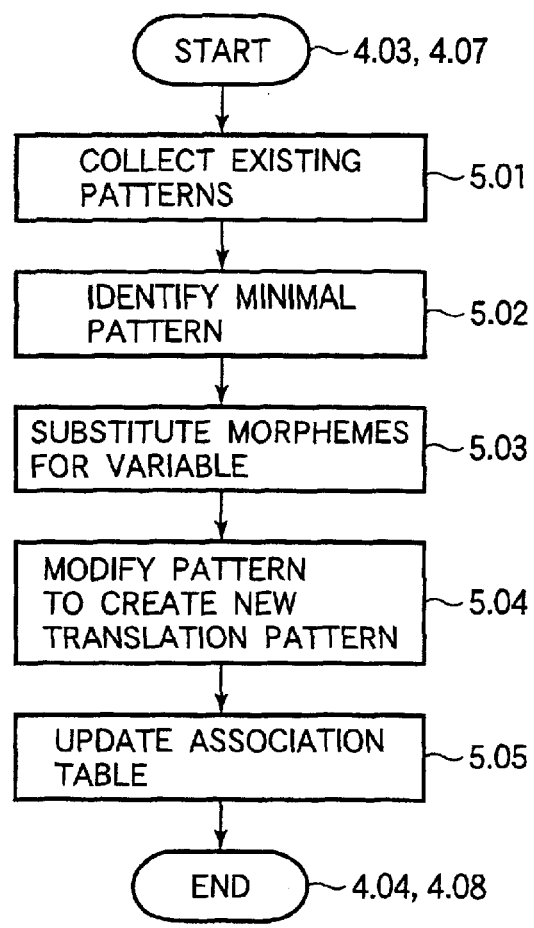
FIG. 15 shows another example of a reconstructed association table stored in DiffBuffer.
FIG. 16 is a flowchart of the main parts of the translation pattern creation process in the first embodiment.

If there are one or more associations classified in class S', the pattern generator takes one such association and creates a translation pattern involving it (step 4.03). The details of this process will be described later (FIG. 16). The process of creating translation patterns is repeated until it has been carried out for all the associations in class S' (step 4.04).

For the first example sentence, nothing could be done in step 4.01 and the association table stored in DiffBuffer was left in its initial state (FIG. 9), so no new translation patterns are created in step 4.03. For the second example sentence, step 4.01 created two new associations in class S', as shown in FIG. 13, so the process of creating a translation pattern in step 4.03 is carried out twice.

If the association table in DiffBuffer was not updated ('No' in step 4.02), or when the process of creating translation patterns for all associations in class S' has ended ('No' in step 4.04), the pattern generator 1.32 determines whether there is still an unmatched morpheme, either a translated sentence morpheme not associated with a modified sentence morpheme or a modified sentence morpheme not associated with a translated sentence morpheme, in the association table in DiffBuffer (step 4.05).

If there is not, the processing shown in FIG. 11 ends, and the post-editing learning process proceeds to step 3.07 in FIG. 7, to enter new information in the user translation pattern dictionary 1.44 as noted above.

If there is an unmatched morpheme in the association table in DiffBuffer, the pattern generator 1.32 reconstructs the association table of differences in DiffBuffer (step 4.06). This reconstruction process differs from the process in step 4.01 in that it does not rely on existing information found in the translation pattern dictionary 1.42 and user translation pattern dictionary 1.44.

FIG. 14 explains how the association table is reconstructed. Four cases (1–4) are illustrated, the unreconstructed state being shown on the left and the reconstructed state on the right.

In the first case (1), there is a modified sentence morpheme (class Mx) in DiffBuffer, but no unmatched translated sentence morpheme. The unmatched modified sentence morpheme (class Mx) is concatenated with the preceding and following modified sentence morphemes, the translated sentence morphemes corresponding to the preceding and following morphemes are concatenated, and the resulting association of the concatenated translated sentence morphemes and concatenated modified sentence morphemes is placed in class S' in the updated association table in DiffBuffer.

In the second case (2), an unmatched translated sentence morpheme (class Px) is consecutively preceded or followed by one or more unmatched modified sentence morphemes (class Mx) in DiffBuffer. The translated sentence morpheme in class Px and the modified sentence morpheme (or morphemes) in class Mx can therefore be associated without a crossover. This is done, and the resulting pair of morphemes is classified in class S' in the updated association table in DiffBuffer.

In the third case (3), there is an unmatched translated sentence morpheme (class Px) and an unmatched modified sentence morpheme (class Mx), or a consecutive sequence of unmatched modified sentence morphemes, in DiffBuffer, but the translated sentence morpheme in class Px and the modified sentence morpheme (or morphemes) in class Mx cannot be associated without causing a crossover. Alternatively, there is an unmatched translated sentence morpheme (class Px) and two or more non-consecutive unmatched modified sentence morphemes (class Mx). In this case, the translated sentence morphemes and modified sentence morphemes are concatenated over a range sufficient so that they can be associated without crossover, and the resulting association is classified in class S' in the updated association table in DiffBuffer.

In the fourth case (4), which covers situations not included in the above cases (1–3), there are two or more unmatched translated sentence morphemes (class Px) in DiffBuffer. Each unmatched translated sentence morpheme (class Px) is paired with an unmatched modified sentence morpheme (class Mx), with concatenation as in the third case (3), for example, to avoid crossovers, and the resulting associations are classified in class S' in the updated association table in DiffBuffer.

For the first example sentence, since the unreconstructed association table is in the state shown in FIG. 9, the third case (3) above applies; the reconstruction process combines the translated sentence morphemes 'kiroku' and 'rieki' into one morpheme, and combines the modified sentence morphemes 'shunyu' and 'kiroku' into another morpheme. FIG. 15 shows the association table in DiffBuffer for the first example sentence following the reconstruction process. The association of 'kiroku rieki' with 'shunyu kiroku' 21.1 is placed in class S'.

For the second example sentence, all unmatched morphemes have already been paired as in FIG. 13. (More precisely, the association table is in the state shown in FIG. 20, as described later). Since there are no unmatched morphemes left to be paired, the reconstruction process is not carried out.

After the association table of differences has been reconstructed as described above, the pattern generator 1.32 takes the new class S' associations obtained by the reconstruction process one by one, and creates translation patterns involving them (step 4.07 in FIG. 11). The process of creating a translation pattern in step 4.07 is same as the process in step 4.03; a detailed description will be given below using FIG. 16.

The process of creating a translation pattern is repeated until it has been carried out for all the associations in class S' (step 4.08). When there are no more associations in class S' the processing shown in FIG. 11 ends, and the post-editing learning process proceeds to step 3.07 in FIG. 7, to enter new information in the user translation pattern dictionary 1.44 as noted above.

FIG. 16 is a flowchart that shows the detailed process of creating a new translation pattern in step 4.03 or 4.07 in FIG. 11. The process makes use of a parameter n, which was omitted in FIG. 11, indicating the number of new translation patterns created so far in steps 4.03 and 4.07.

Before the translation pattern creation process begins, ChildPatternBuffer is cleared. The pattern generator 1.32 then collects all the translation patterns from OrgPatternBuffer including translated sentence morphemes belonging to one association in class S', and stores them in ChildPatternBuffer (step 5.01). As noted above, these translation patterns were generated by the translation processor 1.2 and do not necessarily appear in the translation pattern dictionary 1.42 or user translation pattern dictionary 1.44.

Next, the pattern generator 1.32 identifies the smallest upper-level translation pattern that can include all the patterns stored in ChildPatternBuffer as lower-level elements, and stores this smallest or minimal pattern in OrgEntryPatternBuffer[n] (step 5.02). If there is only one translation pattern stored in ChildPatternBuffer, that pattern itself is stored in OrgEntryPatternBuffer[n].

Next, if any variables appear in the translation pattern stored in OrgEntryPatternBuffer[n], the pattern generator 1.32 uses the patterns stored in OrgPatternBuffer to substitute words for the variables (step 5.03). That is, variables are resolved into source sentence morphemes and translated sentence morphemes.

The translated sentence morpheme or morphemes included in the pattern stored in OrgEntryPatternBuffer[n] are then replaced with the corresponding modified sentence morpheme or morphemes, and the resulting translation pattern is stored as a new translation pattern in EntryPatternBuffer (step 5.04).

Finally, the association table in DiffBuffer is updated by reclassifying the association between each replaced translated sentence morpheme and the modified sentence morpheme that replaced it into class S (step 5.05).

The translation pattern creation process shown in FIG. 16 will now be explained through examples.

For the second example sentence, since step 4.01 places the association table in DiffBuffer in the state shown in FIG. 13, two new translation patterns are created in step 4.03.

The first time, when the parameter n is zero, translation patterns involving the translated sentence morpheme 'notame ni' are collected from OrgPatternBuffer and stored in ChildPatternBuffer in step 5.01. There is one such translation pattern, namely pattern 11.2a in FIG. 6.

Since pattern 11.2a is the only translation pattern in ChildPatternBuffer, it is stored in OrgEntryPatternBuffer[n] in step 5.02 without further processing as the first pattern (n=0) in FIG. 17. FIG. 17 also shows part-of-speech (pos) identity information, which was omitted in FIG. 6.

Since this translation pattern includes the variable [1:NP], the process in step 5.03 substitutes the source sentence morpheme "the variable" and the translated sentence morpheme 'hensu' into the translation pattern. FIG. 18 shows the translation pattern stored in OrgEntryPatternBuffer[0] after the substitution of these words for the variable.

Next, the translated sentence morpheme 'notame ni' (the first morpheme in class S' on the left in the table in FIG. 13) included in the translation pattern stored in OrgEntryPatternBuffer[0] is replaced with the modified sentence morpheme 'notame no' (taken from the right side of the table in FIG. 13), and the result is entered in EntryPatternBuffer[0] in step 5.04. This replacement converts the Japanese pattern 18.2a [ja:PostModN hensu no tame ni] in FIG. 18 to the modified Japanese pattern 19.2a [ja:PostModN hensu notame no], thereby creating the first new translation pattern (n=0) in FIG. 19.

Finally, in step 5.05, the association table in DiffBuffer is updated by reclassifying the association of 'notame ni' with 'notame no' from class S' into class S, as shown in FIG. 20.

After the above process has ended, an unprocessed class S' association (16.2b in FIG. 13) still remains, so the parameter n is incremented to 1, and the translation pattern creation process in step 4.03 begins again. A detailed description will be omitted. Briefly, the existing translation pattern (n=1) in FIG. 17 is converted to the new translation pattern (n=1) in FIG. 19 by replacing 'kokan' with 'chikan', and the association table in DiffBuffer is updated to the final state shown in FIG. 20, in which the associations of both 'notame no' 20.2a and 'chikan' 20.2b have been changed to class S.

In this final state, no unprocessed association in class S' remains, and the post-editing learning process proceeds to the process that determines whether there is an unmatched morpheme or not in step 4.05. For the second example sentence, since there is no unmatched morpheme (class Mx or Px), the translation pattern creation process in step 4.07 is not carried out and the processing ends.

For the first example sentence, as noted above, when the post-editing learning process proceeds to step 4.01, the association table in DiffBuffer is still in the state shown in FIG. 9. The association table is not updated in step 4.01, so the post-editing learning process proceeds from step 4.02 to step 4.05, the association table is reconstructed in step 4.06 to the state shown in FIG. 15, and the translation pattern creation process in step 4.07 begins. The parameter n is carried over from the translation pattern creation process in step 4.03. For the first example sentence, since step 4.03 was skipped, when the process in step 4.07 starts, the parameter n is zero.

To begin the translation pattern creation process in step 4.07, the pattern generator 1.32 scans OrgPatternBuffer, finds the two patterns shown in FIG. 21 including the two parts of the translated sentence morpheme 'kiroku rieki' in class S', and stores them in ChildPatternBuffer in step 5.01.

Next, the pattern generator 1.32 identifies the smallest upper translation pattern that can include the two translation patterns stored in ChildPatternBuffer, and stores it in OrgEntryPatternBuffer[0] in step 5.02. This upper translation pattern may be, for example, a pattern taken from the translation pattern dictionary 1.42 or the user translation pattern dictionary 1.44 during syntax analysis and generation. Here it will be assumed that the minimal pattern identified in step 5.02 and stored in OrgEntryPatternBuffer [0] is the translation pattern shown in FIG. 22, which indicates how an arbitrary English noun phrase consisting of a noun followed by a noun phrase can be translated into Japanese.

Figure 6:
FIG. 6 shows partial examples of results of syntax analysis and generation, as stored in OrgPatternBuffer in FIG. 1.

In step 5.03, words are substituted for the variables in the pattern stored in OrgEntryPatternBuffer[0], using the patterns stored in OrgPatternBuffer (see FIG. 6). That is, the source sentence morphemes "record" and "profit", and the translated sentence morphemes 'kiroku' and 'rieki' are substituted for the variables [1:N], [2:NP], and [1:Ms] in the translation pattern in FIG. 22. FIG. 23 shows the translation pattern stored in OrgEntryPatternBuffer[0] after the substitution of these words for the variables.

Next, the translated sentence morpheme 'kiroku rieki' included in (the Japanese part of) the translation pattern stored in OrgEntryPatternBuffer[0] is replaced with the modified sentence morpheme 'shunyu kiroku', and the result, shown in FIG. 24 is stored in EntryPatternBuffer[0] in step 5.04.

Finally, the association table in DiffBuffer in step 5.05 is updated by reclassifying the association (in FIG. 15) between the translated sentence morpheme 'kiroku rieki' that has been replaced and the modified sentence morpheme 'shunyu kiroku' that replaced it from class S' into class S.

After this reclassification of the association from class S' into class S, there is no association left in class S', and the processing shown in FIG. 11 ends.

The translation patterns that have been stored in EntryPatternBuffer[n] as described above are now stored in the user translation pattern dictionary 1.44 in step 3.07 (see FIG. 7). If a comparison of a translation pattern with the morpheme dictionary 1.41 and the user morpheme dictionary 1.43 identifies an unknown word or discloses other information that should be added to the morpheme dictionary, this information is added to the user morpheme dictionary 1.43.

Figure 25:
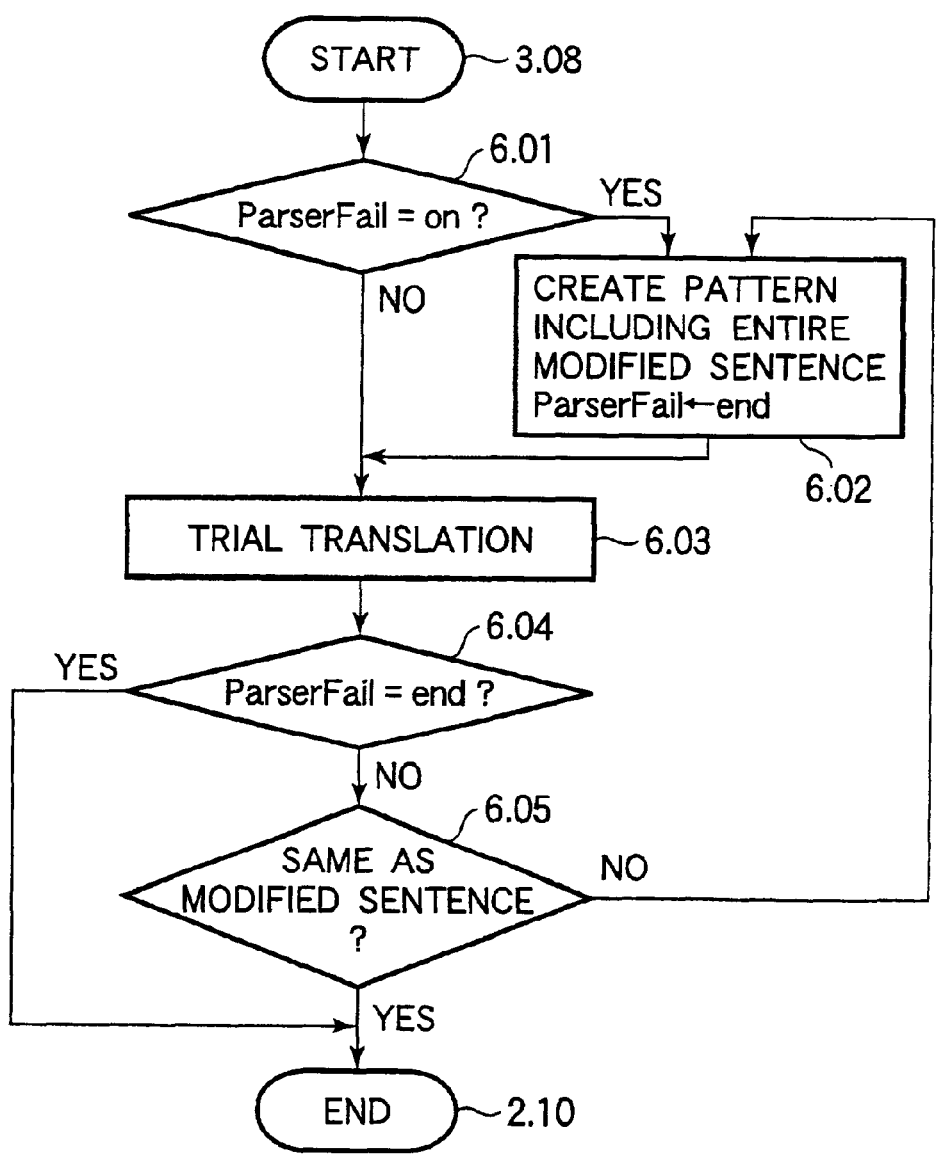
FIG. 25 is a flowchart of the trial translation process in the first embodiment.

The post-editing learning unit 1.3 now initiates the trial translation process to confirm the validity of the translation patterns that have been added as user entries (step 3.08 in FIG. 7). FIG. 25 is a flowchart that shows the trial translation process by which step 3.08 is carried out.

First, whether the ParserFail flag is set to the 'on' state or not is determined (in step 6.01). If the ParserFail flag is set to the 'on' state, a translation pattern including all morphemes in the modified sentence is created and stored in the user translation pattern dictionary 1.44, and the ParserFail flag is set to the 'end' state (step 6.02).

As noted above, the ParserFail flag is set to the 'on' state if the analysis of the syntax of the source sentence failed (step 3.03 in FIG. 7). If this has happened, the whole source sentence and the whole modified sentence are entered as a translation pattern without further processing, as in pattern B in the prior art, which is repeated below. A detailed description will be omitted.

Pattern B:
[Sentence: The class has a black board.]
[Sentence: Sono kyoshitsu wa, kokuban wo motteiru.]

If the ParserFail flag was not set to the 'on' state, or if the ParserFail flag was set to the 'on' state but the process in step 6.02 has ended and translation patterns including all the modified morphemes have been stored in the user translation pattern dictionary 1.44, the translation command unit 1.35 commands the input-output unit 1.1 to retranslate the source sentence on a trial basis (step 6.03). This retranslation process uses the updated user morpheme dictionary 1.43 and user translation pattern dictionary 1.44, to which the new information has been added.

After the trial translation process ends, the ParserFail flag is tested to determine whether it is set to the 'end' state or not (step 6.04).

If the ParserFail flag is not set to the 'end' state, the result of the trial translation is compared with the modified sentence to determine whether they are the same or not (step 6.05).

If the result of the trial translation is not the same as the modified sentence, the trial translation process returns to the above step 6.02, and a translation pattern including all the modified sentence morphemes is created.

If the ParserFail flag is found to be in the 'end' state in step 6.04, or if the result of the trial translation is found to be the same as the modified sentence in step 6.05, the processing shown in FIG. 25 ends.

The post-editing learning process now proceeds to step 2.10 in FIG. 3, and the result of the trial translation is shown to the user.

The cases arising in the trial translation process shown in FIG. 25 can be summarized as follows.

In one case, syntax analysis failed in the original translation of the source sentence and the ParserFail flag is set to the 'on' state. A translation pattern including the whole source sentence and the whole modified sentence is created, the trial translation process is carried out, and the result is shown to the user without further processing.

In another case, syntax analysis succeeded in the original translation of the source sentence, and one or more translation patterns involving parts of the input modified sentence were created (in step 4.03 or step 4.07). The trial translation process is carried out, and whether the result of the trial translation is the same as the input modified sentence is confirmed.

If the result is same as the input modified sentence, the result is shown to the user without further processing.

If the result of the trial translation is not the same as the modified sentence, a translation pattern including the whole source sentence and the whole modified sentence is created, the trial translation process is carried out again, and the result is shown to the user without further processing. The process in step 6.02 is carried out in this case so that if the same source sentence is input again later, the modified sentence will be output, even though a correct translation pattern may not have been made in the pattern creation process in step 4.03 and in 4.07.

The first embodiment of the invention has the following effects.

Instead of adding a translation pattern for an entire source sentence (including all morphemes in the source sentence), by using the translation patterns already stored in the machine translation system, the first embodiment is able to associate differing morphemes in the translated sentence and modified sentence, and add comparatively short translation patterns including the source sentence morphemes for which the translated sentence morphemes and the modified sentence morphemes differ. Thus only the minimum amount of entry information needed to generate the modified sentence is added to the user dictionaries, dictionary space is conserved, and dictionary size can be reasonably small.

In addition to adding these shorter translation patterns including the source sentence morphemes for which the translated sentence morphemes and the modified sentence morphemes differ, if the result of the trial translation process is not the same as the modified sentence, the first embodiment creates a translation pattern in which the whole modified sentence is paired with the whole source sentence. Thus the first embodiment can always assure that if the same source sentence is input again later, the translation result will match the modified sentence.

Adding the shorter translation patterns including the source sentence morphemes for which the translated sentence morphemes and the modified sentence morphemes differ enhances the versatility of the added translation patterns. For example, the first embodiment can add a user entry in which "black board", which was not correctly translated before, is associated with the desired translation 'kokuban'.

To obtain these translation patterns with enhanced versatility, the user only has to enter the modified sentence, and does not have to enter the source sentence.

Since the user translation pattern dictionary in the first embodiment stores the same types of translation patterns as used from the outset in the translation system, the new translation patterns stored in the user pattern dictionary can easily be incorporated into the system pattern dictionary.

When the machine translation system acquires a new (system) dictionary, if the results of post-editing have been stored, the first embodiment can relearn from the stored results, using the new dictionary, thereby creating a new user dictionary that is highly compatible with the new system dictionary.

Figure 26:
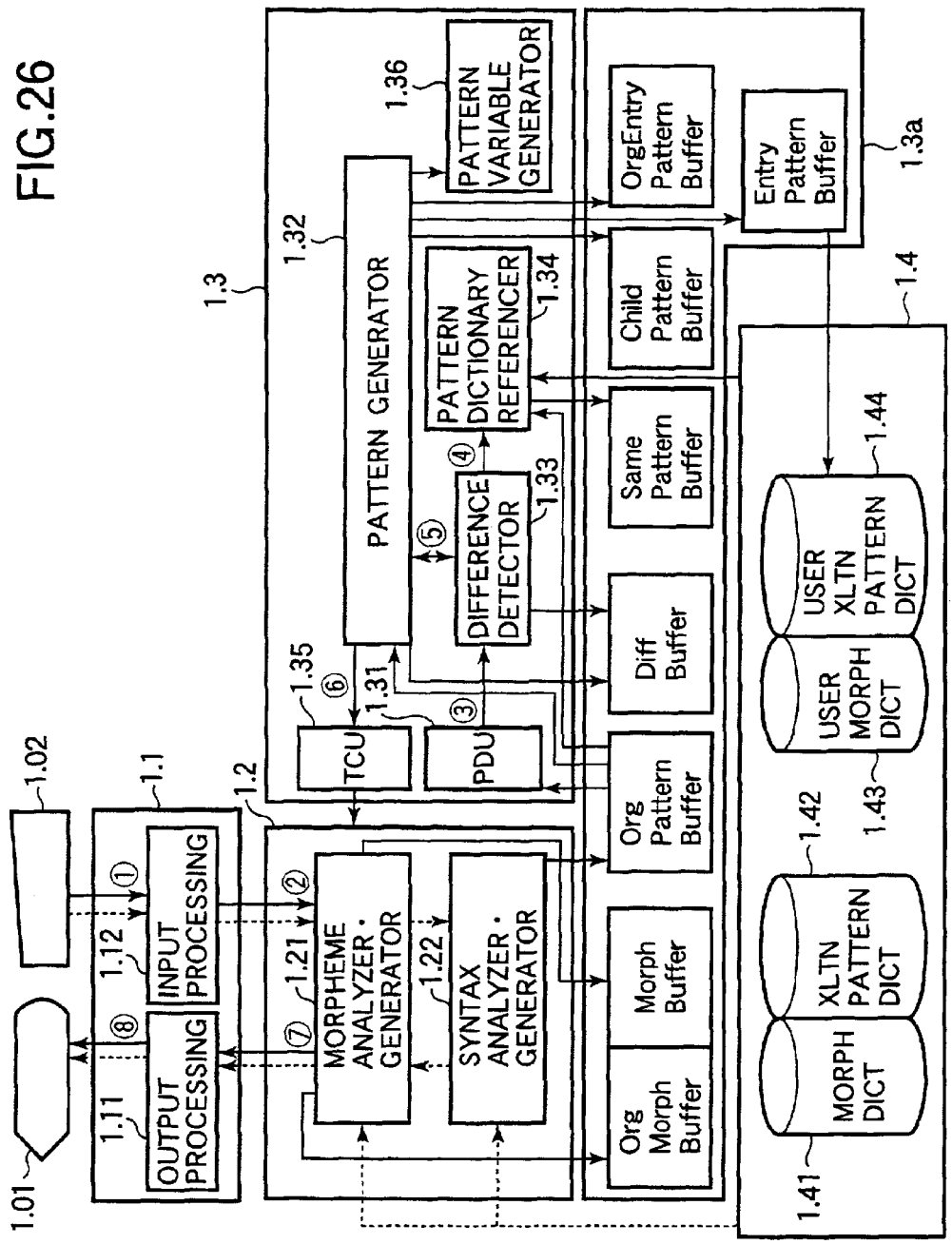
FIG. 26 is a functional block diagram of a machine translation system according to a second embodiment of the invention.

FIG. 26 shows a block structure of the translation-pattern-based machine translation system in the second embodiment. As a comparison of FIGS. 1 and 26 shows, the second embodiment differs from the first embodiment in that the post-editing learning unit 1.3 in the second embodiment includes a pattern variable generator 1.36. The pattern variable generator 1.36, which operates under control of the pattern generator 1.32, has the function of creating translation patterns that include variables, on the basis of modified sentence input.

The second embodiment operates in substantially the same way as the first embodiment, but differs in regard to the sequence of operations that create translation patterns on the basis of a modified sentence in steps 4.03 and 4.07 in FIG. 11.

Figure 27:
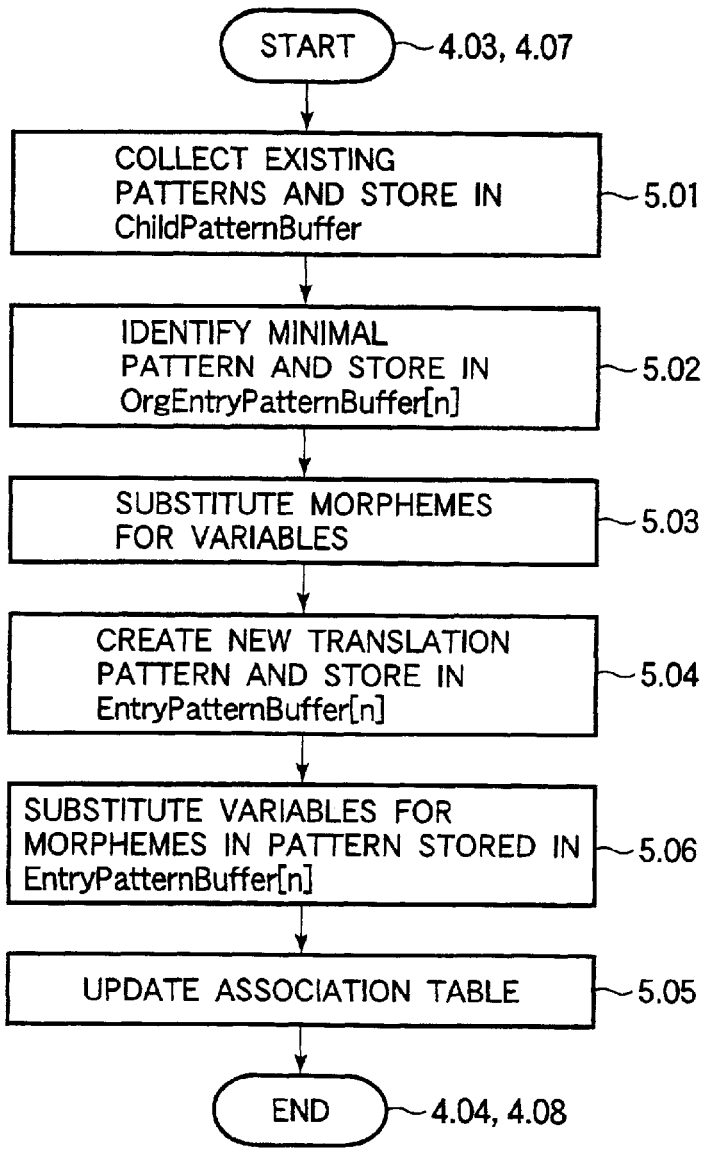
FIG. 27 is a flowchart of the main parts of the translation pattern creation process in the second embodiment.

FIG. 27 is a flowchart that shows the sequence of operations for creating translation patterns on the basis of modified sentences in the second embodiment. Steps 5.01 to 5.05 are identical to the corresponding steps in FIG. 16.

In the second embodiment, the translation pattern creation process does not proceed immediately from the pattern creation process in step 5.04 to the table update process in step 5.05, but first carries out a process of substituting variables for morphemes in the newly created patterns (step 5.06).

This process uses variables to replace clearly matching parts of the translation pattern stored in EntryPatternBuffer [n], which was stored in a form suitable for adding to the user translation pattern dictionary 1.44.

Figure 28:
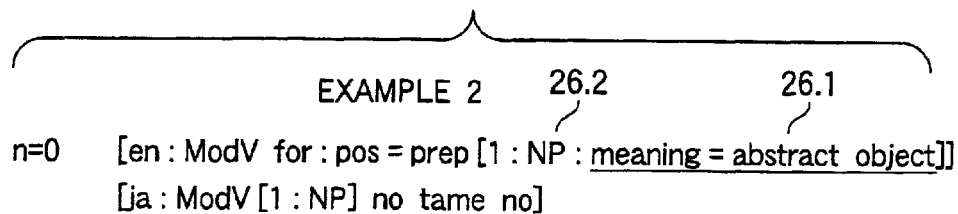
FIG. 28 shows an example of a new translation pattern created for the second example sentence in the second embodiment, as stored in EntryPatternBuffer in FIG. 26.

For example, in the first translation pattern (n=0) shown in FIG. 19, it is known from the translation patterns stored in OrgPatternBuffer and the associations stored in DiffBuffer that the morpheme "the variable" pairs with the morpheme 'hensu'. These morphemes are accordingly replaced with variables including category information 26.2 (NP: noun phrase, a pattern name) and identity information 26.1 specifying that the noun phrase means an abstract object, producing the result shown in FIG. 28.

The reason why the variables in the patterns in OrgPatternBuffer are not used directly (or why existing translation patterns such as translation pattern 14.2a in FIG. 10 are not used directly) is that it is desirable for as many pairs of morphemes as possible to be replaced with variables, regardless of the variables stored in OrgPatternBuffer. It is possible, however, to create new translation patterns by modifying the patterns stored in OrgPatternBuffer, which already include variables, so as to incorporate the modifications in the modified sentence.

The pattern name or category and the identity information or meaning information which are needed in order to generate a variable to replace a morpheme are obtained from the translation pattern stored in OrgPatternBuffer that includes the morpheme being replaced. Pairs of morphemes may also be replaced with variables on the basis of identity information or meaning information stored in the translation pattern dictionary 1.42 and user translation pattern dictionary 1.44.

In addition to the effects of the first embodiment, the second embodiment has the following additional effects.

Substituting variables for morphemes in the new translation patterns created on the basis of the modified sentences further enhances the versatility of the patterns. As a result, the rate of usage of the patterns in the translation process can be increased.

Not only are morphemes replaced with variables in the translation patterns, but in addition, conditions such as semantic meaning can be added to the variables, so the rate of correct translation is increased as well as the rate of usage of the patterns.

Furthermore, with conventional methods, variables could not be substituted for morphemes in translation patterns unless several similar model sentences were available, but in the second embodiment, morphemes can be replaced with variables in translation patterns even when there is only one model (e.g., post-edited) sentence.

Next, some examples of variations of the above embodiments will be mentioned.

Although the embodiments were described as processing one sentence at a time, the processing of several sentences instead of just one sentence is also possible. That is, several sentences can be translated, the results of syntax generation and morpheme generation can be stored in buffers and files, and the translated sentences can be post-edited later. Trial translation is carried out after the post-editing process has completely ended, using new translation patterns created from all of the modified sentences. The term 'text' as used herein can thus mean either a sentence or a group of sentences.

Instead of learning new translation patterns from a source text and a post-edited text, the system can learn new translation patterns from a source text and a model translated text. For example, if a source sentence and a model translated sentence are input, first the source sentence is machine-translated, the results of syntax analysis, syntax generation, and morpheme generation are stored, and a translated sentence is obtained. The processing described in the above embodiments is then carried out using the model translated sentence as the modified sentence. Translation patterns obtained in this way may be added to a system dictionary instead of a user dictionary.

Learning from the results of pre-editing is also possible. For example, an unedited source sentence and the corresponding pre-edited source sentence may both be input. First, the unedited source sentence is machine translated, the results of syntax analysis, syntax generation, and morpheme generation are stored, and a translated sentence is created from these results. Next, the pre-edited source sentence is machine-translated, and the translated result is used in place of the modified sentence (or model translated sentence) in the processing described in the above embodiments.

In the above embodiments, the source language was English and the target language was Japanese, but obviously other combinations of source and target languages are possible.

Although it is anticipated that the present invention will be practiced in a bi-directional machine translation system, the present invention can also be practiced in a unidirectional machine translation system, if a function for morpheme analysis of target-language text is provided.

In a bi-directional machine translation system, the number of translation patterns can be increased by using the machine translation function in the reverse direction to create further new translation patterns, treating the modified sentence as the source sentence, and the original source language sentence as the modified sentence or model translation. The new translation patterns that are created by the bi-directional machine translation function in this way can also be checked against existing patterns to improve the accuracy of the translation patterns.

In the process of confirmation of a newly created translation pattern in the above embodiments, when the result of trial translation was not the same as the modified sentence ('No' in step 6.05 in FIG. 25), a new translation pattern including the whole modified sentence was immediately created. An alternative method is to increase the number of morphemes included in the translation pattern gradually, by using information about the morphemes preceding and following the morphemes already present in the pattern, for example. Each time the number of morphemes in the translation pattern is increased, a trial translation is performed. This process is repeated until the result of trial translation matches the modified sentence, at which point the process is stopped and the new translation pattern is added as a user dictionary entry.

The processing in the second embodiment that substituted variables for morphemes in a translation pattern created on the basis of part of a modified sentence may also be applied to the creation of a translation pattern including a whole modified sentence (e.g., step 6.02 in FIG. 25). For example, input of the following source sentence, translated sentence, and modified sentence can yield the translation pattern shown below the modified sentence, by the processing described in the second embodiment.

Source Sentence:
There are not many gardeners like him left.
Translated Sentence:
Hidari ni kare no yoni okuno niwashi ga inai.
Modified Sentence:
Kare no yona niwashi wa hotondo nokotte inai.
New Pattern:
[Sentence: there [1:BE] many [2:NP] like [3:Prn] left]
[Sentence: [3:Prn] no yona [2:NP1] wa hotondo nokoru teiru [1:Jd]]

The dictionary entries, syntax rules without the substitution of variables for morphemes, and syntax rules with such substitution, which are obtained by separate processes in Japanese Unexamined Patent Application Publication No. H6-119378, can then all be obtained through the same type of processing, as described in the second embodiment above.

In addition to semantic meaning, other conditions (e.g., tense in a verb phrase) may also be added to the variables substituted for morphemes in translation patterns in the second embodiment.

A decision process can be added to the second embodiment, preceding the process of substitution of variables for morphemes, to decide whether or not to carry out the substitution process. The decision process takes account of the possibility that the substitution of variables for morphemes in a translation pattern may cause the translation pattern to be applied too widely, and therefore misused increasingly often. The decision process can assess the suitability of introducing variables into a translation pattern by, for example, calculating a value from such parameters as the variable category (e.g., NP or VP) and the number of non-variable morphemes in the pattern. The value may be calculated as a weighted sum of the parameter values, for example. The substitution of variables for morphemes is then carried out only if the calculated value exceeds a predetermined threshold.

The present invention is useful for a machine translation system that employs translation patterns, but is also applicable to the adding of information to a dictionary used in a machine translation system that does not employ translation patterns.

Those skilled in the art will recognize that further variations are possible within the scope claimed below.

What is claimed is:

1. An apparatus for receiving a first text in a source language and a second text in a target language, the second text being a desired translation of the first text, and deriving, from the first text and the second text, new information to be added to a dictionary used in machine translation, comprising:

a morpheme generator for generating a first set of morphemes in the target language from the first text;

a morpheme analyzer for analyzing the second text into a second set of morphemes in the target language;

a difference detector for finding differences between the first set of morphemes and the second set of morphemes;

a dictionary referencer for finding existing information in said dictionary including morphemes in the source language corresponding to the differences found by the difference detector; and a pattern generator for automatically generating said new information from the differences found by the difference detector and the existing information found by the dictionary referencer.

2. The method of claim 1, wherein said pattern generator uses the existing information found by the dictionary referencer to associate morphemes in said first set of morphemes with differing morphemes in said second set of morphemes.

3. The apparatus of claim 1, wherein:

said pattern generator automatically generates translation patterns as said new information, each generated translation pattern comprising a source language pattern including at least one morpheme in the source language and a target language pattern including at least one morpheme in the target language; and said dictionary stores said translation patterns.

4. The method of claim 3, wherein:

said pattern generator uses the existing information found by the dictionary referencer to associate morphemes in said first set of morphemes with differing morphemes in said second set of morphemes;

said morpheme generator provides said pattern generator with translation patterns including the morphemes in said first set of morphemes; and said pattern generator generates said new information from the translation patterns provided by said morpheme generator, by replacing morphemes from said first set of morphemes with associated morphemes from said second set of morphemes.

5. The apparatus of claim 3, further comprising a pattern variable generator for generating variables from morphemes in said translation patterns by abstraction from the differences found by the difference detector, using with the existing information found by the dictionary referencer, and replacing said morphemes with said variables in said translation patterns.

6. The apparatus of claim 1, wherein the second text is a post-edited version of a machine translation of the first text.

7. The apparatus of claim 1, wherein the second text is a machine translation of a pre-edited version of the first text.

8. A machine translation system including the apparatus of claim 1.

9. A method of deriving new information, to be added to a dictionary used in machine translation, from a first text in a source language and a second text in a target language, the second text being a desired translation of the first text, comprising:

generating a first set of morphemes in the target language from the first text;

analyzing the second text into a second set of morphemes in the target language;

finding differences between the first set of morphemes and the second set of morphemes;

finding existing information in said dictionary including morphemes in the source language corresponding to said differences; and automatically generating said new information from said differences and said existing information.

10. The method of claim 9, wherein said existing information is used to associate morphemes in said first set of morphemes with differing morphemes in said second set of morphemes.

11. The method of claim 9, wherein:

said new information includes translation patterns, each translation pattern comprising a source language pattern including at least one morpheme in the source language and a target language pattern including at least one morpheme in the target language; and said dictionary stores said translation patterns.

12. The method of claim 11, further comprising:

using translation patterns already stored in said dictionary to generate the first set of morphemes; and using said existing information to associate morphemes in said first set of morphemes with differing morphemes in said second set of morphemes; wherein automatically generating said new information includes modifying the translation patterns used to generate the first set of morphemes by replacing morphemes from the first set of morphemes with associated morphemes from the second set of morphemes.

13. The method of claim 11, wherein said translation patterns include variables, and automatically generating said new information includes generating said variables by abstraction from said differences, using said existing information.

14. The method of claim 9, wherein the second text is a post-edited version of a machine translation of the first text.

15. The method of claim 9, wherein the second text is a machine translation of a pre-edited version of the first text.

16. A machine-readable medium storing a program employing the method of claim 9 to derive new information to be added to a dictionary used for machine translation.

17. A machine translation method using a dictionary, employing the method of claim 9 to derive new information to be added to said dictionary.

18. A machine-readable medium storing a machine translation program employing the method of claim 17.

* * * * *